C. HEROLD.
ELASTIC TIRE.
APPLICATION FILED SEPT. 3, 1910.

1,016,991.

Patented Feb. 13, 1912.

Witnesses.

Inventor
C. Herold
by F. Dittmar
Attorney.

UNITED STATES PATENT OFFICE.

CARL HEROLD, OF BRÜNN, AUSTRIA-HUNGARY.

ELASTIC TIRE.

1,016,991.  Specification of Letters Patent.  Patented Feb. 13, 1912.

Application filed September 3, 1910.  Serial No. 580,288.

*To all whom it may concern:*

Be it known that I, CARL HEROLD, a subject of the Emperor of Austria-Hungary, residing at Brünn, in the Province of Moravia and Empire of Austria-Hungary, have invented a new and useful Elastic Tire, of which the following is a specification.

According to this invention, an elastic tire is formed by stretching around an elastic rim of greater diameter than the inner rim a number of strips of fabric broader than the said rim and by so folding the edge portions of the said strips protruding beyond either edge of the rim, that they are brought into the planes of the said edges, the portions so folded being held in the position given them by sewing or cementing them together and having their edges secured to the inner rim. The triangular folds of the successive layers of fabric strips are so arranged that they are not superposed but juxtaposed.

Figure 1:
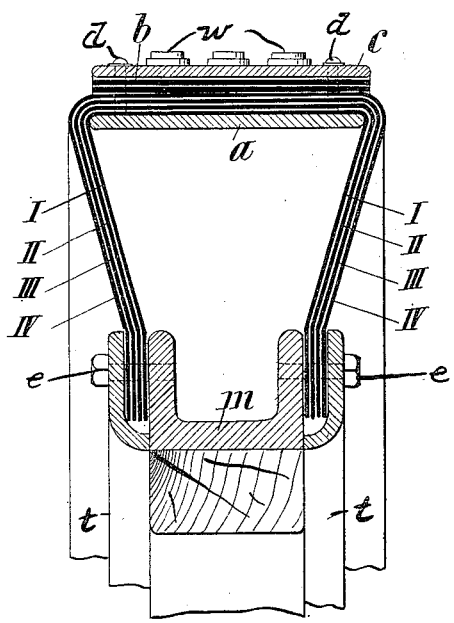
Figure 2:
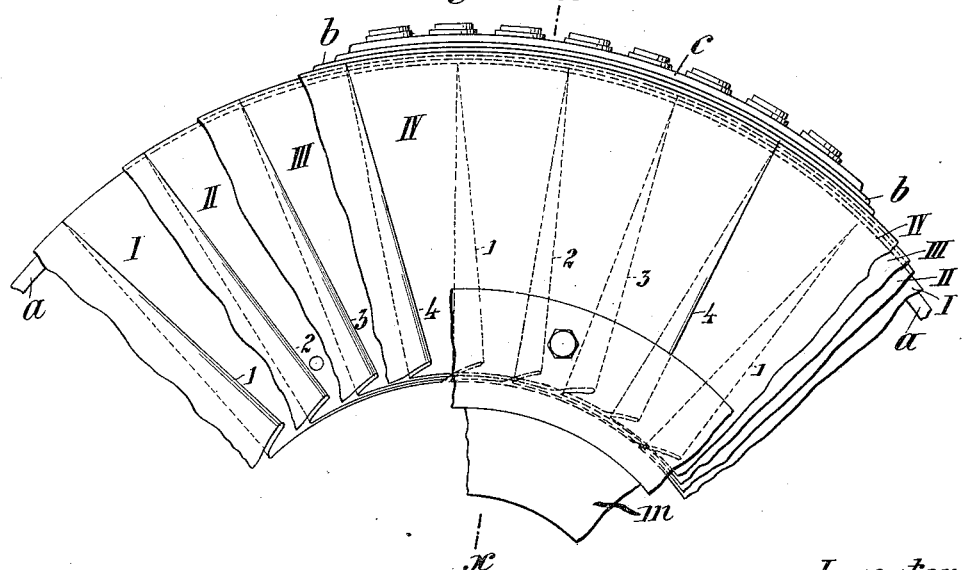

In the annexed sheet of drawings, Figure 1 is a cross section on the line $x$—$x$ of Fig. 2 and Fig. 2 a side elevation of an elastic tire made according to the invention.

Referring to the drawings, $m$ is the inner rim and $a$ is the outer resilient rim of greater diameter. The side plates $t$ may be of any of the well known forms as may also the antiskidding devices $w$. The strips of fabric I, II, III, IV, stretched around the rim $a$ have their borders, which protrude beyond the edges of the rim, so plaited in triangular folds 1, 2, 3 and 4 respectively, that these borders are brought into the planes of the said edges or nearly so, and the folds of the successive layers are so arranged that they are placed side by side. By sewing or by cementing the layers of folded fabrics are kept in the position thus given them and their edges are secured to the inner rim $m$ by any suitable means. Layers $b$ of fabric and a strip of leather $c$ are secured to the circumference of the tire by suitable means, as the bolts or the like $d$. The borders of the strips are secured to the rim by bolts $e$.

What I do claim as my invention, and desire to secure by Letters Patent, is—

In an elastic tire, the combination with the inner rim of an outer resilient rim of greater diameter, a number of strips of fabric broader than and stretched around the said rim and having their protruding borders so plaited in triangular folds and secured to each other as to form with the rim an inwardly open gutter and means for fastening the said borders to the inner rim, substantially as and for the purpose described.

In testimony whereof I affix my signature in the presence of two witnesses.

CARL HEROLD.

Witnesses:
 FRIEDRICH BINDER,
 AUGUST FUGGER.

---

Copies of this patent may be obtained for five cents each, by addressing the "Commissioner of Patents, Washington, D. C."